United States Patent
Harfert et al.

(10) Patent No.: US 9,846,672 B2
(45) Date of Patent: Dec. 19, 2017

(54) SERIAL DEVICE WITH CONFIGURATION MODE FOR CHANGING DEVICE BEHAVIOR

(71) Applicant: Atmel Corporation, San Jose, CA (US)

(72) Inventors: Daniel Harfert, Colorado Springs, CO (US); Richard V. De Caro, El Dorado Hills, CA (US)

(73) Assignee: Atmel Corporation, San Jose, CA (US)

( * ) Notice: Subject to any disclaimer, the term of this patent is extended or adjusted under 35 U.S.C. 154(b) by 291 days.

(21) Appl. No.: 14/612,042

(22) Filed: Feb. 2, 2015

(65) Prior Publication Data
US 2016/0224505 A1    Aug. 4, 2016

(51) Int. Cl.
| | |
|---|---|
| G06F 13/00 | (2006.01) |
| G06F 13/42 | (2006.01) |
| G06F 13/16 | (2006.01) |
| G06F 11/30 | (2006.01) |
| G06F 11/32 | (2006.01) |
| G06F 9/44 | (2006.01) |

(52) U.S. Cl.
CPC ........ *G06F 13/4282* (2013.01); *G06F 9/4411* (2013.01); *G06F 11/3027* (2013.01); *G06F 11/3037* (2013.01); *G06F 11/327* (2013.01); *G06F 13/1694* (2013.01)

(58) Field of Classification Search
USPC .................................. 710/104–110, 305–315
See application file for complete search history.

(56) References Cited

U.S. PATENT DOCUMENTS

| | | | | |
|---|---|---|---|---|
| 6,606,670 B1* | 8/2003 | Stoneking | ............... | G06F 8/665 710/11 |
| 6,745,270 B1* | 6/2004 | Barenys | ............... | G06F 13/4291 710/104 |
| 6,799,233 B1* | 9/2004 | Deshpande | ......... | G06F 13/4291 710/107 |
| 7,484,027 B1* | 1/2009 | Dahlin | ................ | G06F 13/4072 710/305 |
| 7,526,584 B2* | 4/2009 | Yu | ......................... | G06F 9/4411 709/220 |
| 7,788,431 B2* | 8/2010 | Deshpande | ......... | G06F 13/4068 710/110 |
| 8,832,343 B2* | 9/2014 | Decesaris | ............. | G06F 13/385 710/104 |
| 2005/0097255 A1* | 5/2005 | Barenys | ............... | G06F 13/4286 710/316 |

(Continued)

*Primary Examiner* — Raymond Phan
(74) *Attorney, Agent, or Firm* — Fish & Richardson P.C.

(57) ABSTRACT

Systems, methods, circuits, devices and computer-readable mediums for configuring serial devices are disclosed. In some implementations, a device comprises: an input for receiving first and second requests from a serial bus; a decoder coupled to the input and configured to determine if either of the first and second requests is a configuration mode request; a controller coupled to the decoder and configured to: in response to a determination that the first request is a configuration mode request, program a configuration block with configuration data obtained from the serial bus and alter a device behavior according to the configuration data; and in response to a determination that the second request is not a configuration mode request, perform one or more actions on the device according to the second request.

17 Claims, 5 Drawing Sheets

(56) References Cited

U.S. PATENT DOCUMENTS

| | | | |
|---|---|---|---|
| 2005/0120155 A1* | 6/2005 | Chao | G06F 13/4027 710/305 |
| 2007/0250648 A1* | 10/2007 | Picard | G06F 13/4291 710/9 |
| 2008/0215779 A1* | 9/2008 | Deshpande | G06F 13/4291 710/110 |
| 2008/0270654 A1* | 10/2008 | Reberga | G06F 13/4282 710/110 |
| 2013/0245854 A1* | 9/2013 | Rinne | H02M 3/156 700/297 |
| 2014/0101349 A1* | 4/2014 | Engl | G06F 13/4072 710/104 |
| 2015/0106541 A1* | 4/2015 | Southcombe | G06F 13/4282 710/110 |
| 2015/0293864 A1* | 10/2015 | Hill | G06F 13/22 710/109 |

* cited by examiner

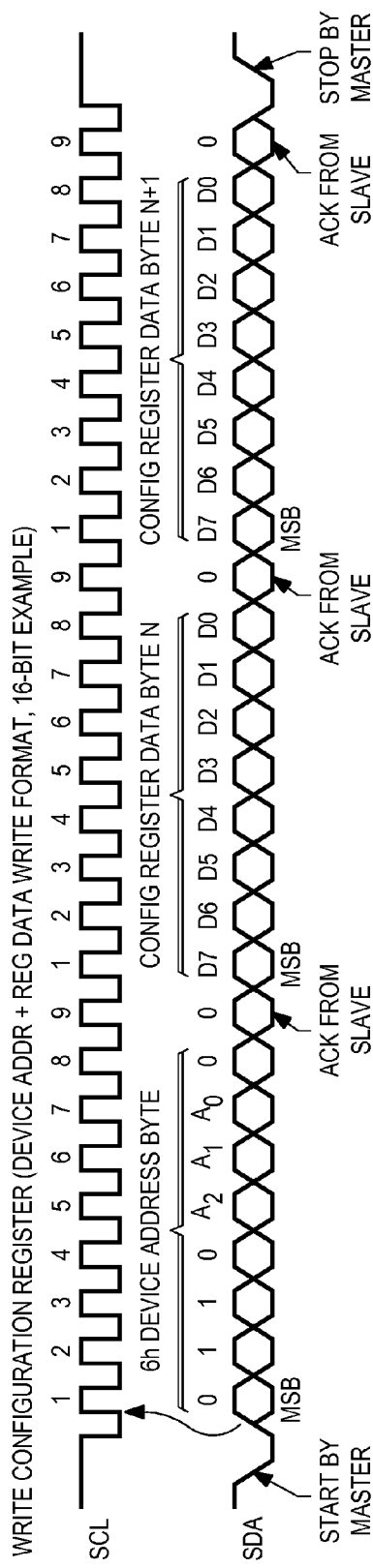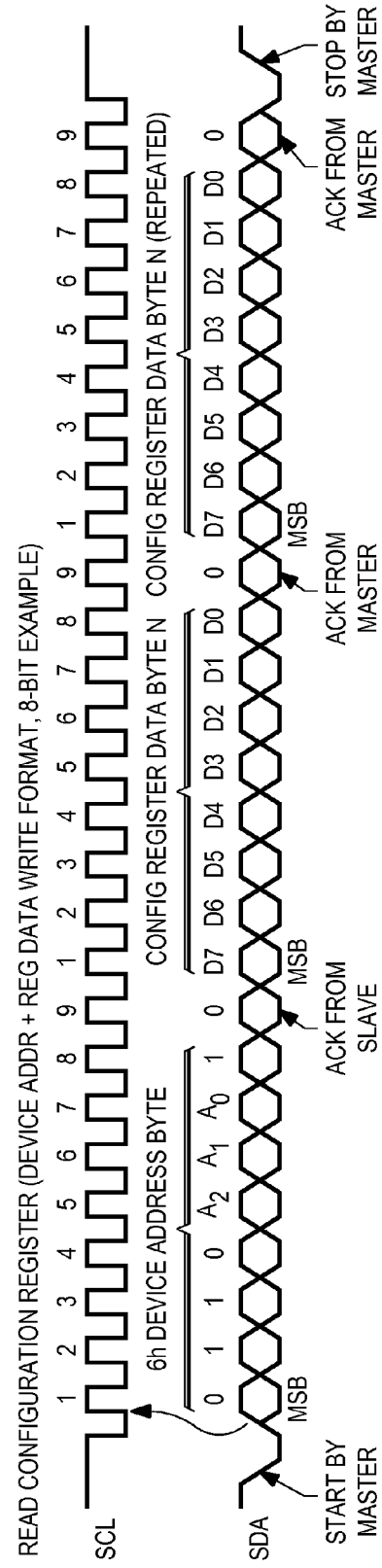

SERIAL DEVICE WITH CONFIGURATION MODE FOR CHANGING DEVICE BEHAVIOR

TECHNICAL FIELD

This disclosure relates generally to configuring serial devices.

BACKGROUND

An Inter-Integrated Circuit (I2C) bus is a multi-master, multi-slave, single-ended, serial computer bus often used for attaching low-speed peripherals (e.g., serial memory devices) to computer motherboards and embedded systems. I2C protocol does not provide mechanisms for changing the internal behavior of a peripheral device, resulting in different versions of serial devices being manufactured for different applications.

SUMMARY

Systems, methods, circuits, devices and computer-readable mediums for configuring serial devices are disclosed.

In some implementations, a device comprises: an input for receiving first and second requests from a serial bus; a decoder coupled to the input and configured to determine if either of the first and second requests is a configuration mode request; a controller coupled to the decoder and configured to: in response to a determination that the first request is a configuration mode request, program a configuration block with configuration data obtained from the serial bus and alter a device behavior according to the configuration data; and in response to a determination that the second request is not a configuration mode request, perform one or more actions on the device according to the second request.

In some implementations, a method comprises: receiving, by the device, first and second requests from a serial bus; determining, by a decoder circuit, if either of the first and second requests is a configuration mode request; in response to a determination that the first request is a configuration mode request: programming, by the controller of the device, a configuration block with configuration data obtained from the serial bus and altering, by the controller of the device, device behavior according to the configuration data; and in response to a determination that the second request is not a configuration mode request: performing, by a controller of the device, one or more actions according to the second request.

In some implementations, a non-transitory, computer-readable storage medium having instructions stored thereon, which, when executed by one or more processors of a device, causes the one or more processors of the device to perform operations comprising: receiving, by the device, first and second requests from a serial bus; determining, by a decoder circuit, if either of the first and second requests is a configuration mode request; in response to a determination that the first request is a configuration mode request: programming, by the controller of the device, a configuration block with configuration data obtained from the serial bus and altering, by the controller of the device, device behavior according to the configuration data; and in response to a determination that the second request is not a configuration mode request: performing, by a controller of the device, one or more actions according to the second request.

BRIEF DESCRIPTION OF THE DRAWINGS

FIGS. 2A and 2B illustrate example write transmission sequences for writing a serial memory device.

FIGS. 2C and 2D illustrate example read transmission sequences for reading a serial memory device.

DETAILED DESCRIPTION

The description that follows is an example serial device that includes a configuration mode for changing the internal behavior of the serial device. In this example, the serial device is Electrically Erasable and Programmable Read-Only Memory (EEPROM) device that is accessed by a master device over a serial bus using I2C protocol. The disclosed implementations can be adapted to any serial device or serial protocol where there is a desire to change the internal behavior of a serial device.

Example Serial Device Architecture

Figure 1:
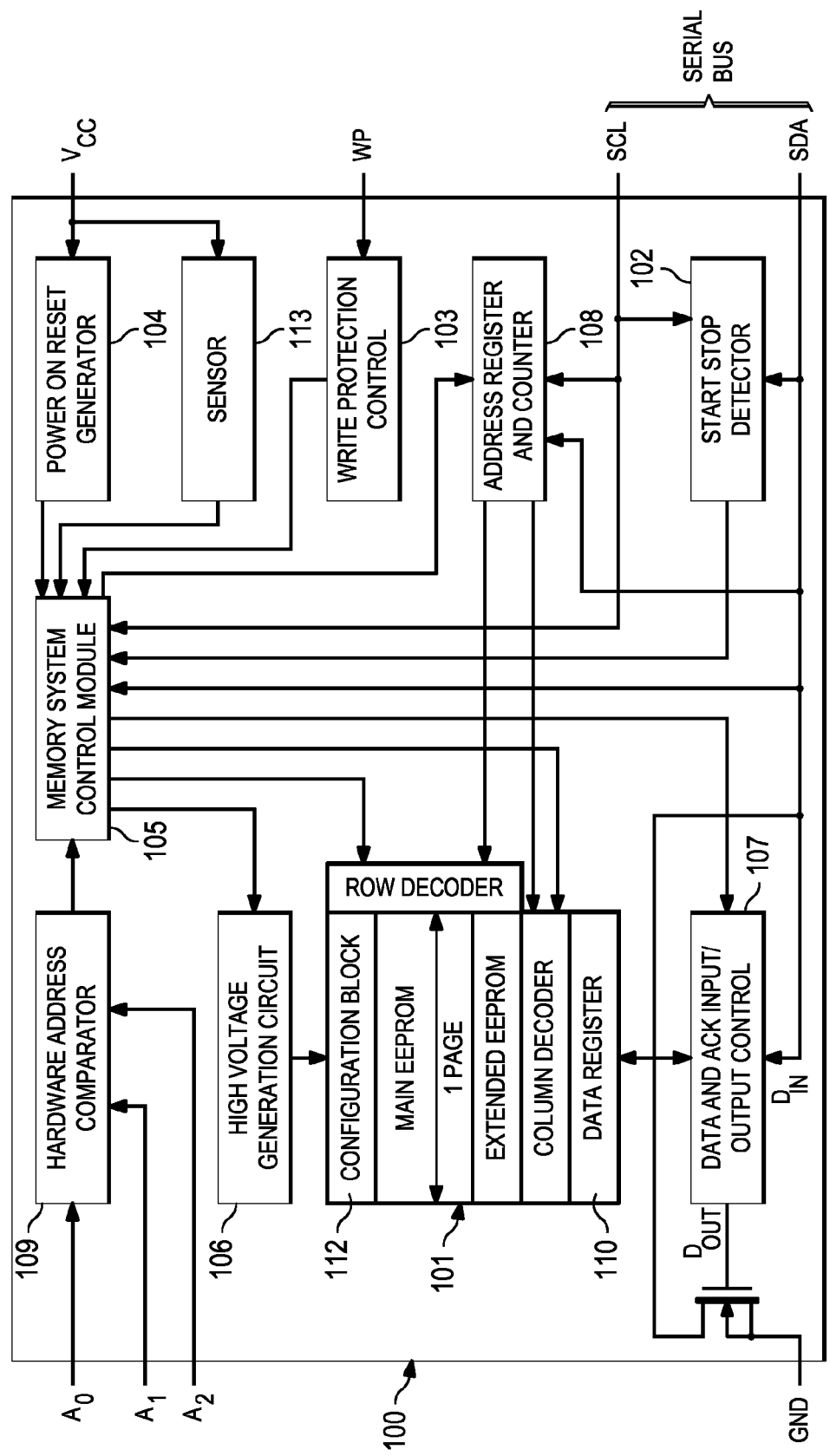
FIG. 1 is a conceptual block diagram of a serial memory device having a configuration mode.

FIG. 1 is a conceptual block diagram of a serial memory device 100 having a configuration mode. In some implementations, serial memory device 100 can include memory array 101, start/stop detector 102, write protection control module 103, power-on-reset (POR) generator 104, memory system control module (MSCM) 105, high voltage generation circuit 106, input/output control module 107, address register and counter 108, hardware address comparator 109 and sensor 113.

Memory array 101 is comprised of bits of EEPROM. Data is written into and read from memory array 101 using column and row decoders 114, 115. EEPROM is a nonvolatile storage meaning the data is retained after power is removed. Memory array 101 can be divided into a number of memory zones, as described in detail below.

Start/stop detector 102 monitors the state of the data line (SDA) and clock line (SCL) to look for Start and Stop signals. SDA and SCL comprise a serial bus. Starts and Stops are defined in I2C protocol as changes in the SDA line when SCL is high.

Write protection control 103 monitors the state of the write protection input (WP pin) and relays that state to MSCM 105. MSCM 105 uses the WP input to decide if a given write operation on memory array 101 should be allowed or aborted.

POR generator 104 is a circuit that prevents serial memory device 100 from powering up into the wrong state. POR generator 104 is used to set various circuits in serial memory device 100 to a safe default condition. POR generator 104 monitors the state of the supply voltage $V_{CC}$. POR generator 104 is designed to bring serial memory device 100 into and out of reset at a $V_{CC}$ level that is safe for other circuits of serial memory device 100 to function correctly.

MSCM 105 controls functions of serial memory device 100 with a state machine (not shown). MSCM 105 receives inputs from other circuits in serial memory device 100 to determine how serial memory device 100 should react or not react to various events.

High voltage generation circuit 106 multiplies the $V_{CC}$ level input to a higher level(s) that is to be utilized by the decoding circuitry (row decoder, column decoder) around memory array 101. Writing and erasing memory array 101 requires a voltage higher than what is supplied by $V_{CC}$.

Input/output control module 107 receives the current bit that is incoming to serial memory device 100 from the SDA line and the current bit that serial memory device 100 is shifting out on the SDA line. Outgoing data is shifted to the SDA line from data register 110. Incoming data is latched in from the SDA line and sent to data register 110.

Address register and counter 108 comprise a register that maintains the current memory address being accessed and points to the next memory address (N+1) for subsequent memory access operations.

Hardware address comparator 109 monitors the state of the hardware address pins ($A_0$, $A_1$ and $A_2$). These states are sent to MSCM 105, which compares these values with the values latched in on the SDA bus during initial access of device 100 to determine if the protocol on the serial bus is intended for device 100.

According to I2C protocol, a master device (not shown) can send a memory access command (a read or write request) to serial memory device 100 to write or read memory array 101. For a write request, and after a START signal, the master device sends on the serial bus the address for memory device 100 with a direction bit clear (write), followed by a two byte memory address. The master device then sends data bytes to serial memory device 100 to be written in memory array 101 starting at the two-byte memory address, followed by a STOP signal. When writing multiple bytes, the bytes are in the same n-byte page (e.g., 32-byte page). While serial memory device 100 is saving those bytes to memory array 101, serial memory device 100 does not respond to further I2C requests from the master device or other master devices.

For a read request, and after a START signal, the master device writes the address of memory device 100 with a direction bit clear (write) and then the two bytes of memory data address. The master device then sends a repeated START signal and the address of memory device 100 with the direction bit set (read). Serial memory device 100 will then respond with the data bytes beginning at the specified memory address. The master device issues an ACK, after each read byte except the last byte, and then issues a STOP signal. Serial memory device 100 increments the address after each data byte transferred. Multi-byte reads can retrieve the entire contents of memory array 101 using one combined message.

Configuration Mode

In some implementations, serial memory device 100 is configured to implement a configuration mode on serial memory device 100 that allows certain device behaviors to be altered by write requests without the need for external high voltage (e.g., 10V+). Some examples of device behaviors that can be altered in configuration mode include but are not limited to: memory array protection, lock current configuration, disabling hardware address pins, disabling configuration mode, under-voltage lock out (UVLO) control and device state reporting. In some implementations, configuration mode is implemented by configuration block 112 located in a portion of memory array 101 that can be programmed during a write request using a selected serial protocol (e.g., I2C), as described in reference to FIGS. 2A and 2B. In some implementations, configuration block 112 can include one or more configuration registers depending upon the applications to be performed by the device. In some implementations, the one or more configuration registers are n-bit (e.g., 16-bit) nonvolatile read/write registers.

The memory array protection function can be set for legacy protection mode or enhanced protection mode. In legacy protection mode the full memory array can be write protected. In enhanced protection mode the memory array is divided into memory zones, where each memory zone has a corresponding register that can be set to respond to write protection (WP) pin assertions for the memory zone or set to be read-only permanently for the memory zone (not responsive to WP pin assertions). The lock current configuration function can be set to disable new writing to the configuration block. The disable hardware address pins function can be set so serial memory device 100 responds to all possible hardware address locations on the serial bus. The disable configuration mode function can be set to permanently disable configuration mode on serial memory device 100 by disabling the response to write requests on the bus that would put serial memory device 100 into configuration mode.

The UVLO control function can be implemented by loading one or more registers in configuration block 112 with a supply voltage detection threshold value, which if not met by the supply voltage, will engage or disengage various device functions (e.g., locks out read or write requests on memory array 101) as a function of how the threshold value has been set. In some implementations, sensor 113 (e.g., a voltage comparator) is coupled between the voltage supply Vcc and MSCM 105. If the supply voltage Vcc drops below the supply voltage detection threshold value (e.g., a user-programmable value stored in configuration block 112 and provided to sensor 113 by MSCM 105), the serial memory device 100 is placed into UVLO control mode. In some implementations, sensor 113 can be included in POR generator 104. The level of sensitivity of the threshold (e.g., the number of programmable levels) can vary by design to meet various application needs.

The device state reporting function can use one or more registers of configuration block 112 to report various device states. Some examples of device states include but are not limited to reporting when serial memory device 100 is busy (e.g., busy reading or writing), ready or otherwise unable to take action. In some implementations, an error correction engine state can be reported, such as reporting whether the last exercised read or write operation invoked the error correction mechanism of serial memory device 100 or read the state of a monotonic counter that tracks the number of error correction events over the life of serial memory device 100. The number of registers (e.g., 8-bit registers in configuration block 112) required to implement the above functions depends on the number of functions implemented. For example, the UVLO control function can be implemented with a single dedicated 8-bit register. Additionally, the size of memory array 101 or the size of the memory zones can dictate the appropriate number of zone protection registers, as described below in reference to FIGS. 2A and 2B.

Example Read/Write Transmission Sequences in Configuration Mode

Figure 2B:
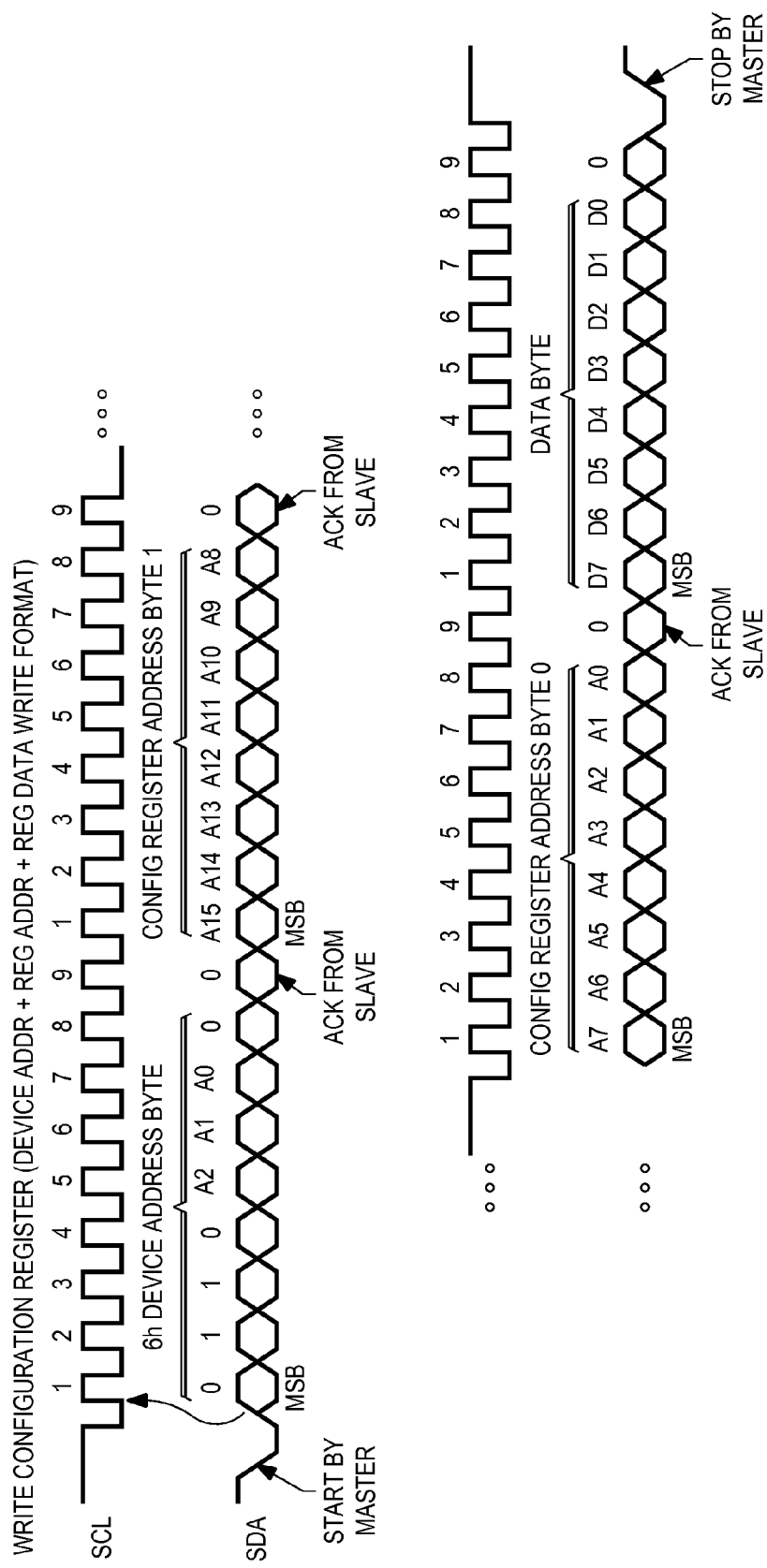

FIGS. 2A and 2B illustrate example write transmission sequences for a serial bus protocol that implements configuration mode in serial memory device 100. In the example shown, the serial bus protocol is I2C. The example operations can be adapted to other serial bus protocols depending on the application.

In some implementations, accessing registers in configuration block 112 is done through the use of device address bytes that are different than the address byte used to access memory array 101. Any device address hexadecimal value can be used though it is desired to select one that is not in conflict with other device addresses on the serial bus. For maximum flexibility, the four most significant bits (MSB) of the device address can be modified in firmware. To reduce a possibility of conflict, for serial memory devices (e.g., EEPROM devices), the device address 6h can be a default due to other serial memory devices that have used this value for other purposes. The modification in firmware allows the serial memory device to be modified by, for example, a manufacturer when necessary to avoid system conflict if it were to arise in applications.

After the device address byte has been sent by a master device on the serial bus, the following example protocol can either follow a format <device address+register address+register data (read/write)> or a format <device address+register data (read/write)>. The selection of one format over the other can depend on the number of configurations registers in configuration block 112 that are used by the application. In an example implementation where there is only one or two registers used in configuration block 112, the <device address+register data (read/write)> format can be used, where the entire configuration register contents can be used to read or write in every bus transaction. If the number of configuration registers is more than a few (e.g., more than two) a <device address+register address+register data (read/write)> can be used to minimize the size of the bus transaction and to allow quick access to the desired register contents.

Figure 2D:
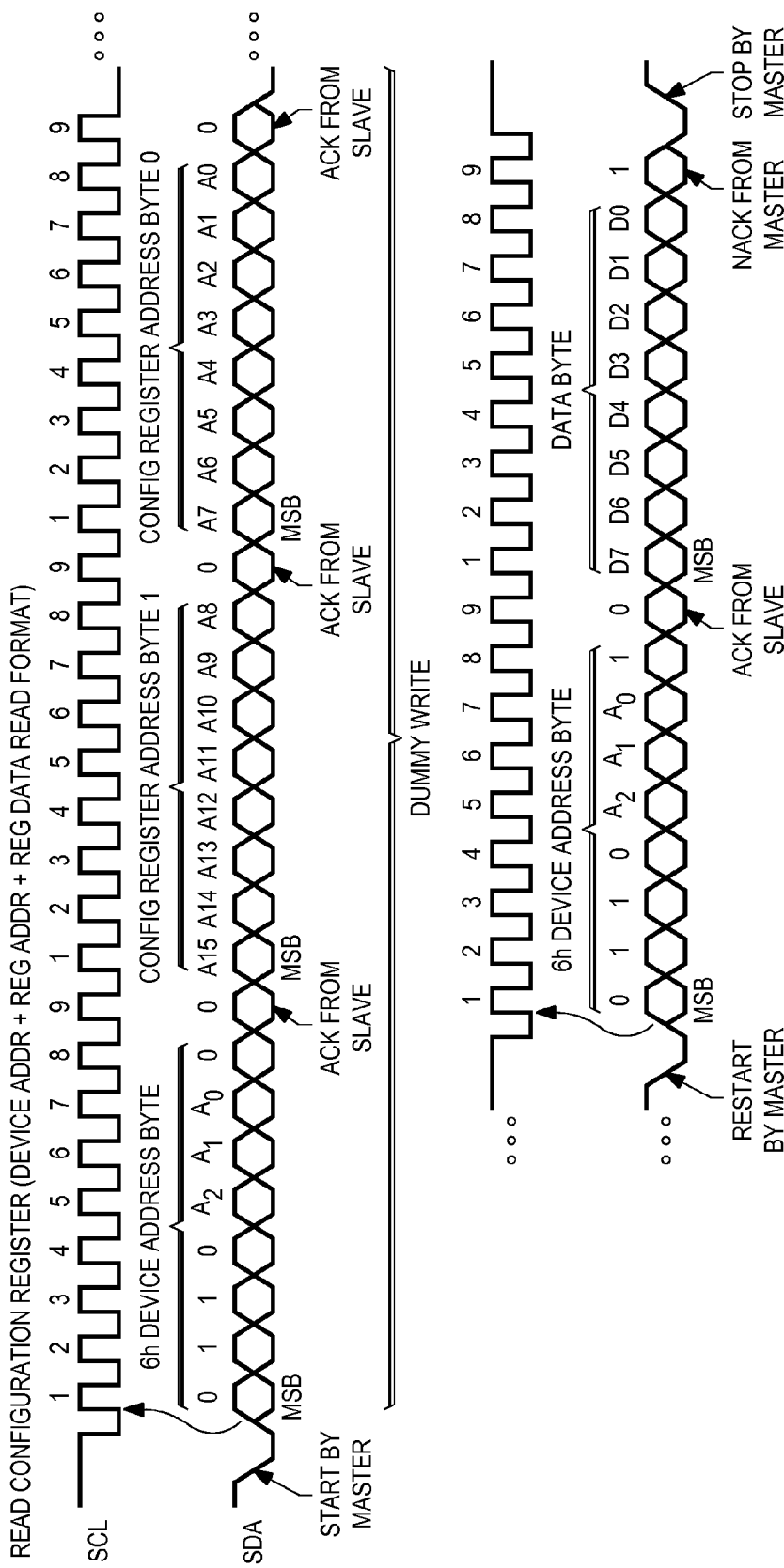

Referring to FIGS. 2A-2D, in some implementations configuration block 112 can be accessed in an n-byte (e.g., 4-byte) transmission sequence that programs one or more registers in configuration block 112 with one or more write requests using one of the two example protocol formats described above. The reading of one or more registers in configuration block 112 can be done by setting an address pointer to an address register with a "dummy" write sequence first. FIG. 2A illustrates a write transmission sequence using the example protocol format <device address+register data (write)>, FIG. 2B illustrates a write transmission sequence using the example protocol format <device address+register address+register data (write)>, FIG. 2C illustrates a read transmission sequence using the example protocol format <device address+register data (read)> and FIG. 2D illustrates a read transmission sequence using the example protocol format <device address+register address+register data (read)>.

The write transmission sequences start with a device address byte shifted onto the SDA line by a master device, following a START signal on the serial bus generated by the master device. The device address byte begins with bits <0110> (6h), followed by three hardware address bits $<A_2 A_1 A_0>$, that match the value of the state of the $A_2$, $A_1$, $A_0$ pins of serial memory device 100, shown in FIG. 1. The least significant bit (LSB) is a direction bit that indicates a read or write request. Each bit in the transmission sequence is sent on the SDA line serially, one bit per SCL pulse. For devices where some of the hardware address pins are not present, the hardware address bits become logic "0" in the transmission sequence. Logic "0" is used for the direction for both reading and writing configuration block 112. In the case of a read, logic "0" can be used as part of a "dummy" write transmission sequence to set the address pointer in address register 108.

The next n bytes in the write transmission sequence are determined by the protocol format implemented. If there are a large number of configuration registers to address, it may be desired to implement the example protocol described in reference to FIGS. 2B and 2D. In this case, after the device address byte is sent, the next n bytes in the transmission sequence are the n configuration register address byte(s). Finally, the last byte is the data word byte(s) to be read out or data word byte(s) to be written. The data word byte(s) include configuration data and can be defined, for example, as described in Table I.

If there are a small number of configuration registers to address (e.g., less than 3 configuration registers), it may be desired to implement the example protocol described in reference to FIGS. 2A and 2C. In this case, after the device address byte is sent, the next n bytes in the transmission sequence are the data word byte(s) read out or data word byte(s) to be written. In the case of reading the registers can be read continuously with their states being updated for each read event.

An example of configuration data is shown in Table I below.

TABLE I

Example Configuration Data

| Register Address | Bit | Function Name | | Description | |
|---|---|---|---|---|---|
| 000h | 7 | RFU | Reserved | 0 | bit serves no function; read always as zero |
| | 6 | ECS | under-voltage detector current state | 0 | Vcc above threshold |
| | | | | 1 | Vcc below threshold |
| | 5 | ECS | error correct current state | 0 | error correction not engaged |
| | | | | 1 | error correction engaged |
| | 4 | PRT | write protection behavior | 0 | legacy protection |
| | | | | 1 | enhanced protection |
| | 3 | DCFG | disable configuration mode | 0 | device will ACK 6h byte |
| | | | | 1 | device will not ACK 6h byte |
| | 2 | FRZR | disable zone registers | 0 | zone register can be written |
| | | | | 1 | zone register read-only |
| | 1 | FRCR | disable configuration mode | 0 | configuration block enable |
| | | | | 1 | configuration block |

TABLE I-continued

Example Configuration Data

| Register Address | Bit | Function Name | Description | |
|---|---|---|---|---|
| | 0 | DHA | disable hardware addressing | 0 disable decode HW address pins<br>1 ACK to all HW slave addresses |
| 0001h | 7:4 | UVLO | under voltage lockout | programmable levels for the UVLO function. Can be 16 distinct levels or partitioned to different operation (e.g., 8 level of read control and 8 level of write control) |
| | 3:0 | RFU | reserved | 0 - bit serves no function; read always as zero |
| 0002h-0003h | 7:0 | ECC count | Monotonic counter value | counts the number of times the ECC engine has corrected errors; count with 2 bytes is 65K event but can grow higher; 3 bytes results in 16.7M events |
| 0004h-max of 0204h | 7:0 | ZPR | zone protection registers | 00h zones that<br>F0h device is<br>0Fh logically<br>FFh segmented into |

In this example configuration, the data beginning at address 0004h corresponds to 16 Kb memory zones that memory array 101 is logically segmented into. The memory zones can be enumerated with a 1-based count. For example, a 64 Kb device will have 4 memory zones and the behavior of those memory zones will depend on the values in addresses 0004h, 0005h, 0006h and 0007h if the full contents of Table I are implemented. Table II below depicts the number of memory zones in each density.

TABLE II

Example Numbers of Memory Zones In Each Density (Based on 64 Kb/Zone)

| 64 Kb | 128 Kb | 256 Kb | 512 Kb | 1 Mb | 2 Mb | 4 Mb | 8 Mb |
|---|---|---|---|---|---|---|---|
| 4 zones | 8 zones | 16 zones | 32 zones | 64 zones | 128 zones | 256 zones | 512 zones |

In the example configuration in Table I, zone protection registers have 4 possible values: 00h, F0h, 0Fh and FFh. The zone protection registers can be programmed to modify the behavior of a corresponding memory zone. One or more protection zone registers can be dedicated to control the WP pin influence over its corresponding zone or to report whether or not the corresponding memory zone is set to read-only. To reduce the quantity of zone protection registers one or more zone protection registers can report both WP input and read-only control values in the same byte. In some implementations, the upper nibble of the zone protection registers can control the hardware protection behavior of the corresponding memory zone. The lower nibble of the zone protection register can control whether the corresponding memory zone has been set to read-only. Table III below defines the behavior of each zone protection register in an implementation where the WP input influence and read-only states are contained within the same byte.

TABLE III

Example Zone Protection Register Configurations

| Register Address | Upper Nibble | Lower Nibble | Behavior Description |
|---|---|---|---|
| All Register Addresses | 0 | 0 | No HW WP set; zone is read-only |
| | 0 | F | No HW WP set; zone is read-only |
| | F | 0 | HW WP set; zone is read/write |
| | F | F | HW WP set; zone is read/write |

Example Configuration Mode Process

Figure 3:
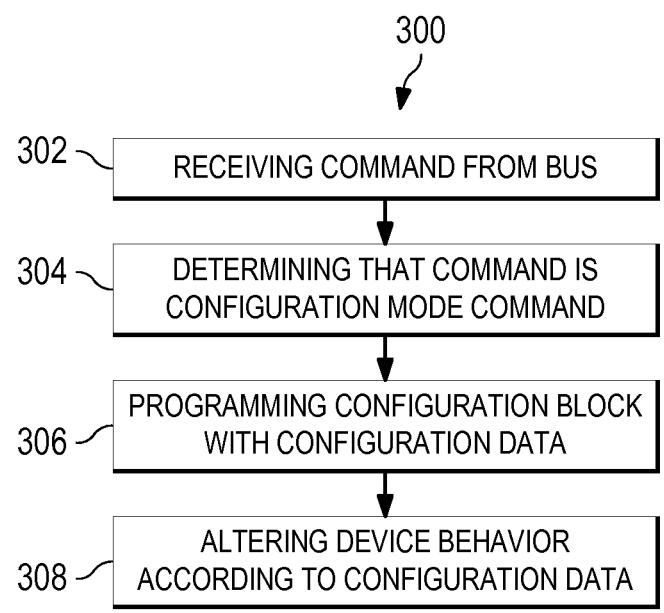
FIG. 3 is a flow diagram of an example process of configuring a serial memory device.

FIG. 3 is a flow diagram of an example process 300 of configuring a serial device. In some implementations, process 300 can begin by receiving a request from a serial bus (302). The serial device can be, for example, a serial memory device and the bus can be an I2C bus. The request can include an n-byte (e.g., 4-byte) transmission sequence sent by a master device on the serial bus. The configuration block can be implemented in a memory array and include one or more configuration read/write registers.

Process 300 can continue by determining that the request is a request to read or write the configuration block (304). For example, the transmission sequence sent by the master device can include a device address byte that includes a set of bits that can be used by the serial device to identify a read or write to the configuration block.

Process 300 can continue by programming the configuration block with configuration data (306). For example, the device address byte can be followed by a two-byte memory address byte of a configuration register in the configuration block. The memory address byte can be followed by a data byte that includes the configuration data.

Process 300 can continue by altering the device behavior according to the configuration data (308). For example, a controller (state machine) can read the configuration data from the configuration block and perform an action that alters the behavior of the serial device according to the configuration data. Some examples of device behaviors that can be altered in configuration mode include but are not limited to: memory array protection, lock current configuration, disabling hardware address pins, disabling configuration mode, UVLO and reporting the device state (e.g., write or error correction in progress).

While this document contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A device, comprising:
an input configured for receiving a request from a serial bus;
a memory array including a configuration block;
the configuration block including:
a configuration register configured for storing first configuration data for configuring the device; and
one or more additional registers corresponding to one or more memory zones of the memory array, where the one or more additional registers are configured to store second configuration data that specify a write protection scheme of the corresponding one or more memory zones;
a decoder coupled to the input and configured to decode the request;
a controller coupled to the decoder and configured to:
in response to the decoded request, program the configuration block with configuration data obtained from the serial bus and alter a device behavior according to the configuration data.

2. The device of claim 1, further comprising:
a sensor coupled to a supply voltage and the controller, the sensor configured to sense an under voltage condition of the device based on configuration data in the configuration block.

3. The device of claim 1, further comprising:
a write protection control module coupled to the controller, the write protection control module configured to assert write protection on the memory array according to configuration data in the configuration block.

4. The device of claim 1, where the configuration block is configured to report a device state to another device over the serial bus.

5. The device of claim 4, where the device state indicates status of at least one of a memory access operation on the memory array, an error correcting operation or a count of error correction lifetime events with a monotonic counter.

6. The device of claim 1, where the serial bus is compliant with Inter-Integrated Circuit (I2C) bus protocol.

7. A method of configuring a device, comprising:
receiving, by the device, a request from a serial bus;
determining, by a decoder circuit that the request is a configuration mode request;
in response to a determination that the first request is a configuration mode request:
programming, by the controller of the device, a configuration block with configuration data obtained from the serial bus and altering, by the controller of the device, device behavior according to the configuration data, the programming including storing first configuration data in a register of the configuration block of a memory array for configuring the device and second configuration in one or more additional registers of the device corresponding to one or more memory zones of the memory array, the second configuration data specifying a write protection scheme for the one or more memory zones.

8. The method of claim 7, further comprising:
determining, by a sensor of the device, an under voltage condition of the device; and
implementing, by the controller of the device, an under voltage lock out on the device using configuration data in the configuration block.

9. The method of claim 7, where the configuration block is configured to report a device state to another device over the serial bus.

10. The method of claim 9, where the device state indicates status of at least one of a memory access operation, error correcting operation or a count of error correction lifetime events.

11. The method of claim 7, further comprising:
asserting, by a write protection control module of the device, write protection on the memory array according to configuration data in the configuration block.

12. The method of claim 7, where the serial bus is compliant with Inter-Integrated Circuit (I2C) bus protocol.

13. A non-transitory, computer-readable storage medium having instructions stored thereon, which, when executed by one or more processors of a device, causes the one or more processors of the device to perform operations comprising:
receiving, by the device, a request from a serial bus;
determining, by a decoder circuit of the device that the request is a configuration mode request;
in response to a determination that the request is a configuration mode request:
programming, by a controller of the device, a configuration block with configuration data obtained from the serial bus and altering, by the controller of the device, device behavior according to the configuration data, the programming including storing first configuration data in a register of the configuration block of a memory array for configuring the device and second configuration in one or more additional registers of the device corresponding to one or more memory zones of the memory array, the second configuration data specifying a write protection scheme for the one or more memory zones.

14. The non-transitory, computer-readable storage medium of claim 13, further comprising:
determining, by a sensor of the device, an under voltage condition of the device; and
implementing, by the one or more processors of the device, an under voltage lock out on the device using configuration data in the configuration block.

15. The non-transitory, computer-readable storage medium of claim 13, where the configuration block is configured to report device state information to another device over the serial bus.

16. The non-transitory, computer-readable storage medium of claim 13, further comprising:

asserting, by a write protection control module of the device, write protection on the memory array according to configuration data in the configuration block.

17. The non-transitory, computer-readable storage medium of claim 15, where the device state indicates status of at least one of a memory access operation, error correcting operation or a count of error correction lifetime events.

* * * * *

UNITED STATES PATENT AND TRADEMARK OFFICE
CERTIFICATE OF CORRECTION

PATENT NO. : 9,846,672 B2  
APPLICATION NO. : 14/612042  
DATED : December 19, 2017  
INVENTOR(S) : Daniel Harfert and Richard V. De Caro Page 1 of 1

It is certified that error appears in the above-identified patent and that said Letters Patent is hereby corrected as shown below:

In the Claims

Column 9, Line 66, delete the word "first" before the word "request".

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*